UNITED STATES PATENT OFFICE.

ABRAHAM B. COX, OF CHERRY VALLEY, NEW YORK, ASSIGNOR TO GENERAL REDUCTION GAS & BY-PRODUCTS COMPANY, OF NEW YORK, N. Y., A CORPORATION OF DELAWARE.

MORTAR FOR FIRE-BRICKS.

1,252,785.     Specification of Letters Patent.     Patented Jan. 8, 1918.

No Drawing.     Application filed April 14, 1917. Serial No. 162,042.

*To all whom it may concern:*

Be it known that I, ABRAHAM B. COX, a citizen of the United States, and a resident of Cherry Valley, Otsego county, New York, have invented a new and Improved Mortar for Fire-Bricks, of which the following is a specification.

My invention relates to mortars or cements which are particularly adapted for use with firebricks, and consists in a mortar which sets quickly, constitutes a remarkably good binder, is very hard, and has a fairly low fusing point, but when fused vitrifies and causes an extremely strong bond between the bricks, so that they cannot be broken apart at the joints.

A typical composition of the mortar or cement consists in 75 parts of shale, 25 parts ground fire brick and 30 parts of sodium silicate. When the bricks are laid in cement of this composition, they adhere together very strongly, and the composition has the advantage of setting very quickly and of forming a hard and durable surface. I have found that when heat is applied the silicate fluxes with the shale at a fairly low temperature, but when fused the cement vitrifies and forms a hard, tough binder, so hard and strong, in fact, that firebrick of the ordinary character will break before the cement, so that the bricks cannot be broken apart at the joints. After vitrification the material is very durable, even when exposed to high temperatures.

Where it is desired to add more body to the material a filler, such as asbestos, can be used, and I have found that by adding 75 parts of asbestos to the composition to which I have referred above, very good results are obtained.

The terms and expressions which I have employed are used as terms of description and not of limitation, and I have no intention, in the use of such terms and expressions, of excluding any equivalents of the ingredients and composition described, but recognize that various modifications are possible within the scope of the invention claimed.

What I claim is:

1. A mortar for firebricks adapted to vitrify when heated to a comparatively low temperature, said mortar being comprised of shale, firebrick and sodium silicate.

2. A mortar for firebricks adapted to vitrify when heated to a comparatively low temperature, said mortar being composed of shale, firebrick, sodium silicate and asbestos.

3. A mortar for firebricks comprised of 75 parts shale, 25 parts ground brick and 30 parts of sodium silicate.

4. A mortar for firebricks composed of 75 parts shale, 25 parts ground brick, 30 parts sodium silicate and 75 parts asbestos.

ABRAHAM B. COX.

Copies of this patent may be obtained for five cents each, by addressing the "Commissioner of Patents, Washington, D. C."